US011807356B2

(12) United States Patent
Arsentyev et al.

(10) Patent No.: US 11,807,356 B2
(45) Date of Patent: Nov. 7, 2023

(54) MULTICOPTER WITH DIFFERENT PURPOSE PROPELLERS

(71) Applicant: ARDN Technology Limited, Warlingham (GB)

(72) Inventors: Dmitry Aleksandrovich Arsentyev, Cheboksari (RU); Marat Ildusovich Sabirov, Zainsk (RU); Nail Ramilevech Zinnurov, Kazan (RU); Ilya Yurevich Rodin, Moscow (RU); Aleksanders Timofejevs, Moscow (RU)

(73) Assignee: SIA InDrones, Augdaugava Municipality (LV)

( * ) Notice: Subject to any disclaimer, the term of this patent is extended or adjusted under 35 U.S.C. 154(b) by 962 days.

(21) Appl. No.: 15/999,532

(22) PCT Filed: Feb. 17, 2016

(86) PCT No.: PCT/IB2016/000444
§ 371 (c)(1),
(2) Date: Aug. 17, 2018

(87) PCT Pub. No.: WO2017/141069
PCT Pub. Date: Aug. 24, 2017

(65) Prior Publication Data
US 2019/0291857 A1    Sep. 26, 2019

(51) Int. Cl.
*B64C 27/20* (2023.01)
*B64C 39/02* (2023.01)
(Continued)

(52) U.S. Cl.
CPC ............ *B64C 27/20* (2013.01); *B64C 39/024* (2013.01); *B64U 10/13* (2023.01); *B64U 30/20* (2023.01);
(Continued)

(58) Field of Classification Search
CPC . B64C 27/20; B64C 39/024; B64C 2201/027; B64C 2201/042;
(Continued)

(56) References Cited

U.S. PATENT DOCUMENTS

| 4,043,421 A * | 8/1977 | Smith | B64C 27/20 180/117 |
| 4,780,838 A * | 10/1988 | Adelson | B64C 27/006 340/945 |

(Continued)

FOREIGN PATENT DOCUMENTS

| CN | 103332292 A | 10/2013 |
| CN | 203 996 885 U | 12/2014 |

(Continued)

OTHER PUBLICATIONS

The Physics of Multirotor Drone Flight, Jan. 29, 2016, The Drone Mag, (Year: 2016).*

(Continued)

*Primary Examiner* — Medhat Badawi
*Assistant Examiner* — Vicente Rodriguez
(74) *Attorney, Agent, or Firm* — MacMillan, Sobanski & Todd, LLC

(57) ABSTRACT

Described here are multicopter systems and methods of operating multicopter systems, including those with a chassis with at least two mounted lift motors and at least four mounted control motors mounted within the chassis, wherein, the at least two mounted lift motors each having a lift propeller, the at least four mounted control motors each having a control propeller, wherein the lift propellers and the control propellers are in parallel planes or coplanar, a computer mounted on the chassis, the computer in communication with the control motors, an electric power source mounted on the chassis, the electric power source connected (Continued)

to the control motors, and an antennae mounted on the chassis, in communication with the computer. In some examples, the control systems are encrypted.

9 Claims, 12 Drawing Sheets

(51) Int. Cl.
  *B64U 10/13* (2023.01)
  *B64U 30/20* (2023.01)
  *B64U 50/11* (2023.01)
  *B64U 50/14* (2023.01)
  *B64U 50/19* (2023.01)
  *B64U 101/60* (2023.01)

(52) U.S. Cl.
  CPC .............. *B64U 50/11* (2023.01); *B64U 50/14* (2023.01); *B64U 50/19* (2023.01); *B64U 2101/60* (2023.01); *B64U 2201/20* (2023.01)

(58) Field of Classification Search
  CPC ........ B64C 2201/044; B64C 2201/108; B64C 2201/128; B64C 2201/146; B64C 2201/162; B64U 10/13; B64U 30/20; B64U 50/11; B64U 50/14; B64U 50/19; B64U 2101/60; B64U 2201/20
  See application file for complete search history.

(56) References Cited

U.S. PATENT DOCUMENTS

| | | |
|---|---|---|
| 6,568,630 B2 | 5/2003 | Yoeli |
| 6,817,570 B2 | 11/2004 | Yoeli |
| 6,883,748 B2 | 4/2005 | Yoeli |
| 7,484,687 B2 | 2/2009 | Martin |
| 7,717,368 B2 | 5/2010 | Yoeli |
| 7,946,528 B2 | 4/2011 | Yoeli |
| 8,020,804 B2 | 9/2011 | Yoeli |
| 8,342,441 B2 | 1/2013 | Yoeli |
| D678,169 S | 3/2013 | Kennelly et al. |
| 8,485,464 B2 | 7/2013 | Kroo |
| 8,496,200 B2 | 7/2013 | Yoeli |
| 8,608,103 B2 | 12/2013 | Martin et al. |
| 8,695,916 B2 | 4/2014 | Martin et al. |
| 8,833,692 B2 | 9/2014 | Yoeli |
| 9,284,962 B2 | 3/2016 | Long et al. |
| D772,756 S | 11/2016 | Gambus et al. |
| 9,540,103 B2 | 1/2017 | Long |
| 9,616,994 B2 * | 4/2017 | Kereth ................... B64C 27/08 |
| 9,618,969 B2 | 4/2017 | Jin |
| D785,541 S | 5/2017 | Du et al. |
| 9,663,237 B2 | 5/2017 | Senkel et al. |
| D792,318 S | 7/2017 | Du et al. |
| D795,787 S | 8/2017 | Blanpain et al. |
| 9,875,592 B1 | 1/2018 | Erikson |
| 9,932,108 B1 | 4/2018 | Viele |
| 9,957,042 B1 | 5/2018 | Vander Lind et al. |
| 2006/0038059 A1 | 2/2006 | Perlo et al. |
| 2007/0018035 A1 | 1/2007 | Saiz et al. |
| 2010/0301168 A1* | 12/2010 | Raposo ................. A63H 23/00 244/171.2 |
| 2012/0056040 A1 | 3/2012 | Brotherton-Ratcliffe et al. |
| 2012/0078451 A1* | 3/2012 | Ohtomo .................... G01S 5/16 701/15 |
| 2012/0234968 A1* | 9/2012 | Smith .................... B64D 17/64 244/12.3 |
| 2015/0012154 A1 | 1/2015 | Senkel et al. |
| 2016/0002375 A1 | 1/2016 | Hashimoto et al. |
| 2016/0009388 A1* | 1/2016 | Brotherton-Ratcliffe .................... G05D 1/042 244/17.13 |
| 2016/0229530 A1* | 8/2016 | Welsh .................... A63H 27/12 |
| 2016/0311522 A1 | 10/2016 | Wiegand |
| 2016/0311529 A1 | 10/2016 | Brotherton-Ratcliffe et al. |
| 2017/0045887 A1* | 2/2017 | Mazin ................. G05D 1/0038 |
| 2017/0112118 A1* | 4/2017 | Mackenzie .......... A01C 23/023 |
| 2017/0147975 A1 | 5/2017 | Natarajan |
| 2017/0174335 A1 | 6/2017 | Malloy |
| 2017/0183081 A1 | 6/2017 | Du et al. |
| 2017/0183099 A1 | 6/2017 | Du et al. |
| 2017/0233070 A1 | 8/2017 | Starace et al. |
| 2018/0046177 A1 | 2/2018 | Hu |
| 2018/0046203 A1 | 2/2018 | Hu |

FOREIGN PATENT DOCUMENTS

| | | |
|---|---|---|
| CN | 104260875 A | 1/2015 |
| DE | 102013108207 | 2/2015 |
| GB | 2551055 A | 12/2017 |
| HU | 1500583 A2 | 6/2017 |
| WO | WO 2016/003530 A2 | 1/2016 |
| WO | WO 2017/107751 A1 | 6/2017 |
| WO | WO 2017/203793 A1 | 11/2017 |

OTHER PUBLICATIONS

International Search Report in PCT/IB2016/000444 dated Nov. 30, 2016 in 5 pages.
Written Opinion of the International Searching Authority in PCT/IB2016/000444 dated Nov. 30, 2016 in 8 pages.
Chinese Office Action, Application No. 201680084656.3, dated Apr. 30, 2021.

* cited by examiner

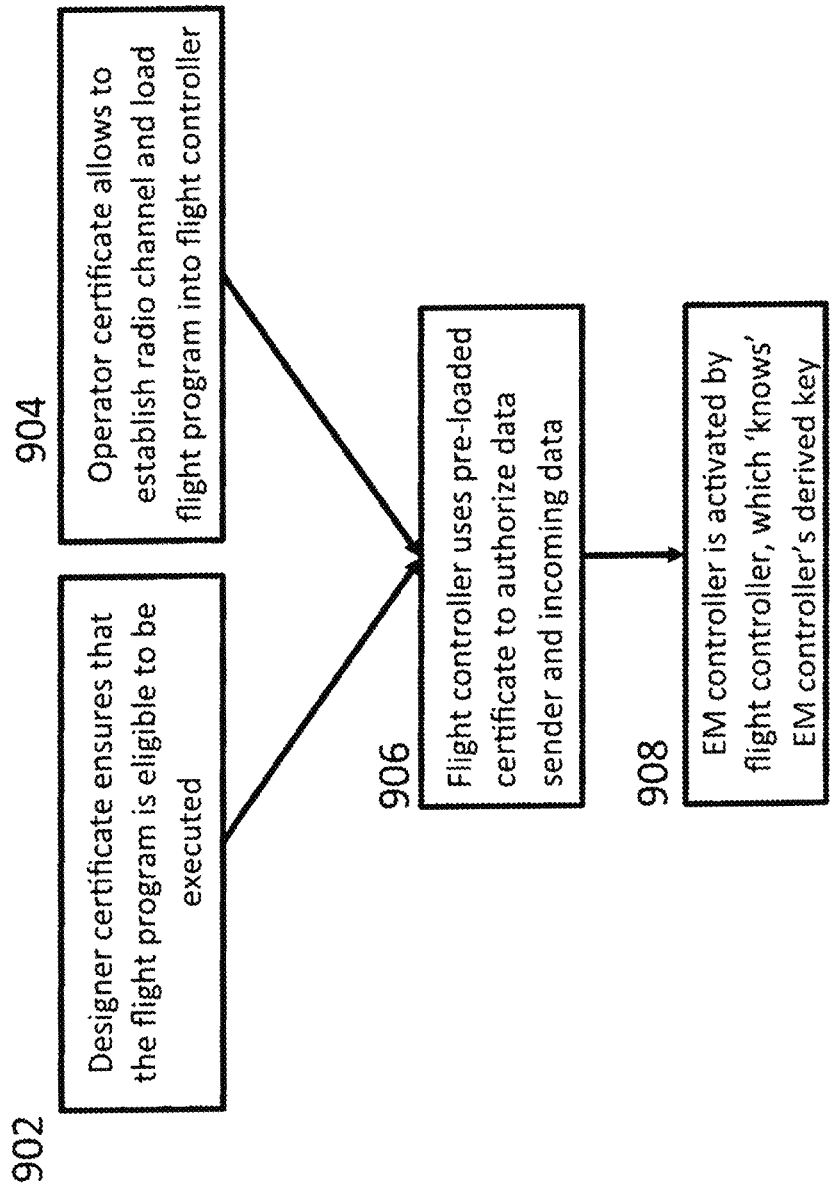

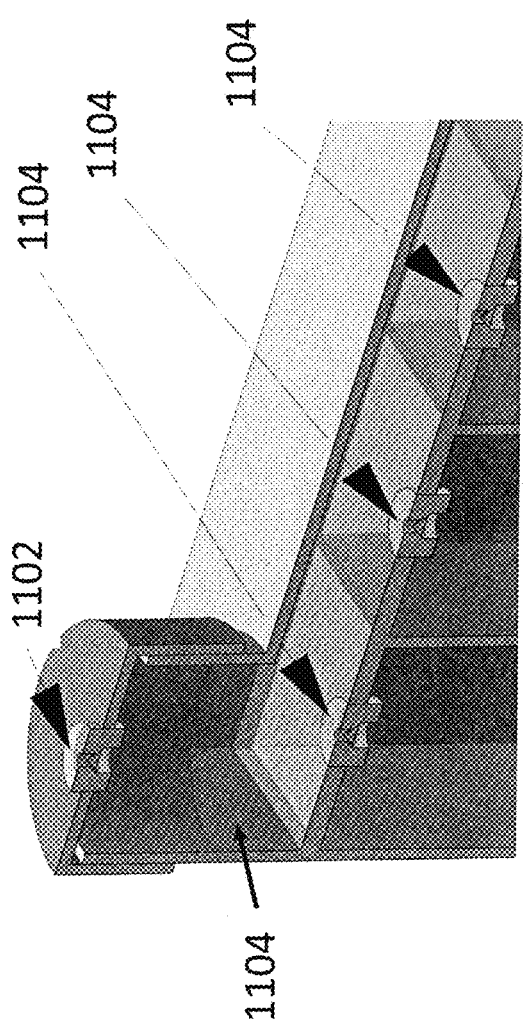

MULTICOPTER WITH DIFFERENT PURPOSE PROPELLERS

BACKGROUND OF THE INVENTION

Technical Field

The disclosed embodiments relate in general to the field of aerial vehicles using propellers and, more specifically, to multicopter aerial vehicles with different purpose propellers.

Description of the Related Art

Current aerial vehicles or aircraft may be powered in many different ways. Difficulty has been associated with multiple propeller aircraft (multicopters) because of the need for complex transmission systems to transmit power to multiple propellers and to control the rotation of this number of propellers. Only the creation of efficient systems of electronic control of electric motors and high-capacity batteries have provided the opportunity to produce miniature designs of such remote radio controlled multicopters. But the attempts to increase the overall dimensions and capacity of motors in such designs have encountered scaling problems. Hindrances involved in this technical task include slow response of large motors, electric or internal combustion, for maneuvering the multicopter body—turning to the left and to the right, sharp climbs, hovering and descents necessitating a sudden rise of motor speed for certain propellers, and reduction thereof for the others. Maneuvering in such ways may require quick changes in propeller motor operation and according to the cube law, the response of the rotating motor elements and the propellers themselves slows down in large motors. For this reason things that can be easily implemented in small sizes are in practice difficult to do in case of large sizes and significant propeller and motor weights as well as inertia problems.

SUMMARY OF THE INVENTION

The present invention provides systems and methods for providing and controlling multicopter including, a chassis with at least two lift motors and at least four control motors mounted to the chassis, wherein, the at least two mounted lift motors each having a lift propeller, the at least four mounted control motors each having a control propeller, wherein the lift propellers and the control propellers are coplanar or in parallel planes, and wherein the lift propellers are at least twice as long as the control propellers, a computer mounted on the chassis, the computer in communication with the control motors, an electric power source mounted on the chassis, the electric power source connected to the control motors, and an antennae mounted on the chassis, in communication with the computer. Some embodiments are further comprising ailerons mounted to the chassis under the lift propellers. In some embodiments the electric power source is one of a battery or generator. In some embodiments, the chassis having a periphery and the chassis includes the lift and control propellers within its periphery. In some embodiments, load sensors may be mounted on the chassis and in communication with the computer, the computer configured to calculate a load imbalance and indicate a warning of the load imbalance. In some embodiments, a sprayer may be mounted on the chassis and in communication with the computer, and in some a hook and winch may be mounted on the chassis. In some embodiments, the chassis is an open framework of aluminum bars. In some examples, the lift motors are at least one of electric, internal combustion or gas turbine. In some embodiments, the computer is in communication with a navigation system and is configured to control the spinning of the controlling propellers to maneuver the flying machine to navigation system navigation points. In some embodiments, the lifting propellers are at least one meter long.

Described here are multicopter systems and methods of operating multicopter systems, including those with a chassis with at least two mounted lift motors and at least four mounted control motors mounted within the chassis, wherein, the at least two mounted lift motors each having a lift propeller, the at least four mounted control motors each having a control propeller, wherein the lift propellers and the control propellers are in parallel planes, wherein the lift propellers are at least twice as long as the control propellers, a computer mounted on the chassis, the computer in communication with the control motors, a battery mounted on the chassis, the battery connected to the control motors, and an antennae mounted on the chassis, in communication with the computer. In some examples, the control systems are encrypted.

Other features and advantages of the invention will be apparent from the following detailed description, taken in conjunction with the accompanying drawings, which illustrate, by way of example, various features of embodiments of the invention.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

FIG. 9 is an example flow diagram consistent with the inventive aspects described here.

FIG. 11 is a detail diagram of an example cargo consistent with the inventive aspects described here.

DETAILED DESCRIPTION

Figure 1:
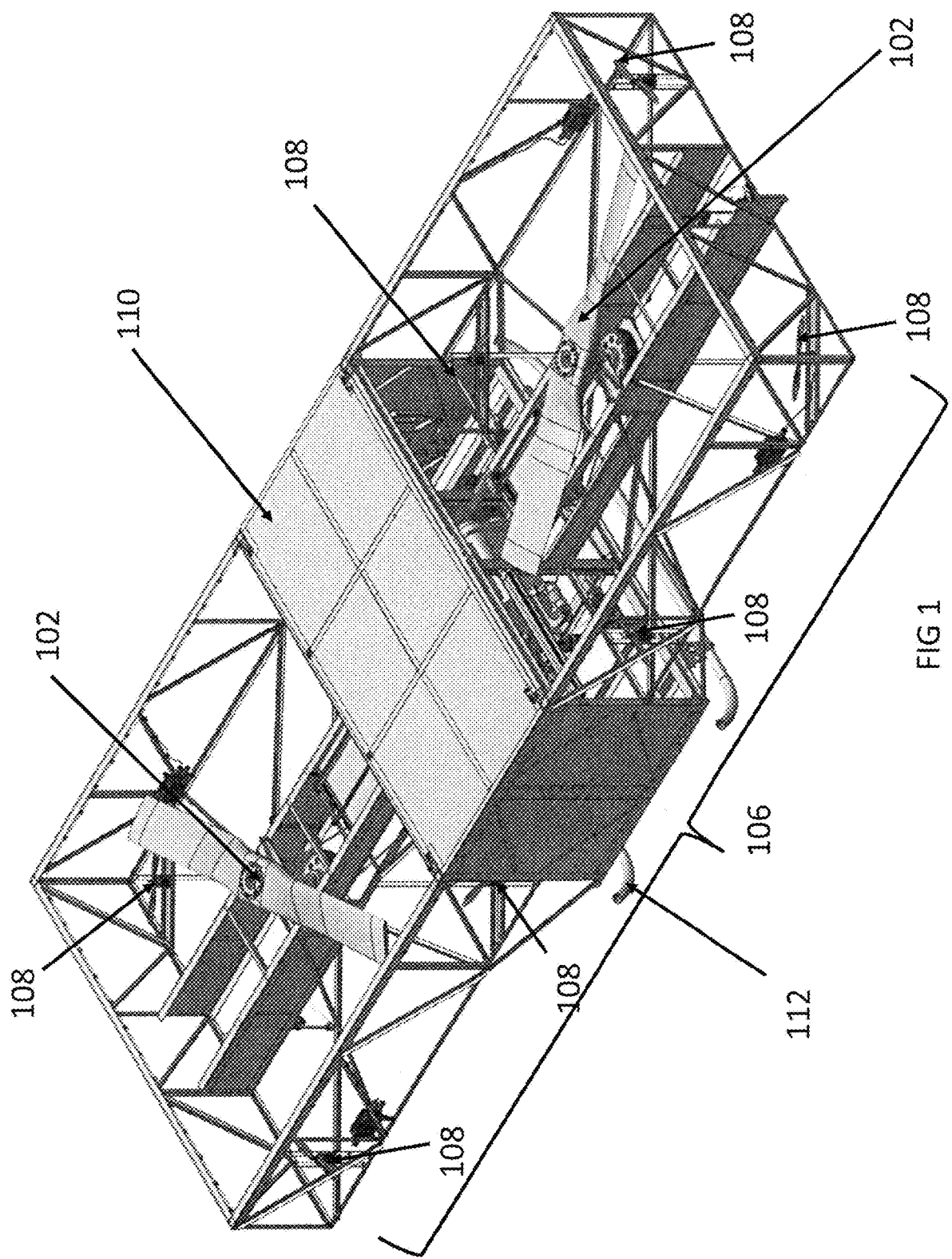
FIG. 1 is a diagram of a multicopter example, consistent with the inventive aspects described here.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

Various flying machines have been utilized over the past century to bring humans off the earth and into the sky. Some machines have been piloted directly by humans, others remotely. As technologies have developed, it has become possible to utilize tested flight methods in new ways. For example, the systems and methods discussed herein provide for new ways to utilize flying vehicles with multiple propellers (multicopter) for lift and control. Because of the advances in computers, the multicopter disclosed here may efficiently fly a stable flight regime in many various conditions. And because of the advances in battery power, such multicopters may be or include electronically powered motors instead of solely powered by jet propulsion, internal combustion, or other ways.

As discussed above, small multicopters less than a meter in diameter for example, have been used by hobbyists to fly and even take and send photos while flying. However, use of small multicopters may not be beneficial in certain industries. In some industries, large dimensions of over two meter wide vehicles capable of lifting heavy payloads and flying long distances may be needed. In such examples, both manned or unmanned aircraft may require significant motor sizes and power capacity, as well as large rotor discs in order to create necessary lift. Moreover, such motors and propellers thereof may be more difficult to control in the pulsed regime of explosive capacity gaining and speed acceleration, and similarly impulsive and sharp reduction of capacity and speed. It is however this regime that is required for an accurate and high-performance control of the multicopter and a responsive change of its spatial orientation, both during propelled flight and hovering. This is where the contradiction is manifested to its maximum extent between the function of creation of lift for the multicopter propellers and the second function of creation of torques to change the multicopter body's spatial orientation and flight mode, in terms of positioning of the multicopter body against the line of travel.

Embodiments described herein solve these problems by using a number of propeller types and/or sizes for different functionality, where all propellers can change their rotation speed and thus control the thrust created by them. In some embodiments, the various propellers are oriented in the same general direction relative to the overall frame or chassis of the vehicle. Thus, instead of some propellers angled one way, and others another, the lifting and control propellers may still affect the pitch, yaw and/or roll of the multicopter by varying their speeds.

Multicopters with different purposes propellers may be used which include a propeller group composed of a certain quantity of propellers of different functional purpose. The propellers may be divided into at least two types based on their intended purpose, namely: lifting propellers developing the main horizontal thrust and creating the lift and maneuvering/controlling propellers determining the spatial orientation of the multicopter body and its position against the line of travel including developing additional, ancillary horizontal lifting thrust. The technical result of application of these engineering solutions is the production of a multicopter which has an easily achievable significant useful load due to manifestation of high lifting power, and at the same time is easy to control and changes its spatial position quickly and easily.

FIG. 1 shows a perspective view example of such a multicopter. In the example, two larger propellers 102 are shown in the chassis (or body, or frame) 106. These two large lifting propellers 102 may be used to provide the bulk of the overall lift to take the multicopter off the ground and hover the multicopter at altitude. In some embodiments, the two lifting propellers rotate in opposite directions. In some example embodiments, the two lifting propellers 102 are located on the same plane as one another, relative to the chassis 106. These lifting propellers 102 each have their own electric motor, their own flight control and may be controlled by any of various computers in the multicopter. Such control can regulate the speed as well as other aspects of each lifting propeller 102 as well as monitor the synchronization of the two propellers, relative to one another. In some embodiments, the lifting propellers 102 share a central motor and turn by a shaft or belt system. In some embodiments, the central lift motor is an internal combustion motor, an electric motor, gas turbine engine, or hybrid motor. In embodiments with an internal combustion motor, or gas turbine engine, individual propellers may not utilize their own, but may share a central motor coupled to a transmission that powers the propellers.

In some examples, the number of lifting propellers 102 could be only two, three, four, five, six, seven, eight, or any number of lifting propellers. The number may be determined by the designed usage and payload of the multicopter.

The chassis 106 of the multicopter in the example is a box-like frame which surrounds the propellers and their propeller arcs. In other words, the chassis 106 in some example embodiments encloses all of the components of the multicopter including the entirety of the propellers. This design allows for some safety as the multicopter propeller arcs may be shielded from structures in flight by the periphery of the chassis 106 body itself. Bumping into a pole or other object in flight may only result in a bump against the chassis 106 and not any propellers which could affect flight or even disable the multicopter. In some embodiments, the smaller control propellers 108 are also enclosed within the periphery of the chassis. Again, this could protect the propellers in operation and also in transport and storage.

A chassis 106 having an outer structure and also a low profile may allow the multicopter to operate in smaller spaces as well as ease transport and storage when not in operation. The box-like frame shown in FIG. 1 is an open frame design made of bars, tubes, I beams, and/or rods, of metal such as aluminum or steel. Any kind of structural framework may be used, the depiction of tubes is not intended to be limiting. Such a frame could be made of any material such as carbon fiber, fiberglass, plastics, sandwiched composites, or other material that is light weight and strong. Any shaped chassis may be used to house the propellers and mechanics, the rectangular design of FIG. 1 being merely exemplary. Other shapes such as a square, circle, ellipse, hexagon, octagon, or other shape could be used. The number and arrangement of lift and control propellers may affect the shape design of the overall multicopter.

The example chassis 106 in FIG. 1 shows a central housing 110 where components such as batteries, antennae, and computers may be mounted to the chassis. Such a housing could take any of various forms and need not be a paneled metal housing as shown. Clear plastic could enclose the housing 110, the housing could be open, or it could be enclosed completely from a plastic or metal enclosure. Landing apparatus, may also be different than the two skids 112 shown in FIG. 1. Any of various skis, wheels, pontoons, rollers or other landing gear could be used for the multicopter.

FIG. 1 also shows, in addition to the larger lifting propellers 102, a set of smaller control propellers 108 spaced within the chassis. In some embodiments, these control propellers 108 are positioned at the edges of the chassis but still within its overall periphery, for example in the corners as shown in FIG. 1. In some embodiments, additional control propellers may be placed in any of various positions around the lifting propellers 102. In some embodiments, the control propellers may be located outside of the chassis. Any kind of mount or frame or stage could be used to support such control propellers. The depiction of the control propellers being located inside of an overall chassis or frame structure is not intended to be limiting. In some embodiments, the control propellers 108 outnumber the larger lifting propellers 102 by a ratio of two to one. In some embodiments, the control propellers may outnumber the lifting propellers in a ratio of four to one. In some embodiments, the control propellers may outnumber the lifting propellers by another ratio. In some embodiments, the control propellers 108 are located on the same plane, generally the same plane, and/or parallel planes as the lifting propellers 102 relative to the chassis 106. In other words, the lifting propellers 102 and the controlling propellers 108 may be oriented in the same direction, or generally the same direction, relative to the chassis instead of oriented in different directions. In such embodiments, different speeds of the control propellers may change the orientation, pitch, yaw and/or roll of the multicopter. In some examples, the control propellers 108 are located at different planes than the lifting propellers 102, such as just above or below, or a combination of above and below the plane of the lifting propellers 102 as viewed from the side of the multicopter.

In some embodiments, the dimensions and weight of the lifting propellers are at least two times larger than the dimensions and weight of the controlling propellers. In some embodiments, the potential thrust provided by the lifting propellers is at least twice as much as the potential thrust that may be provided by the controlling propellers.

Figure 2:
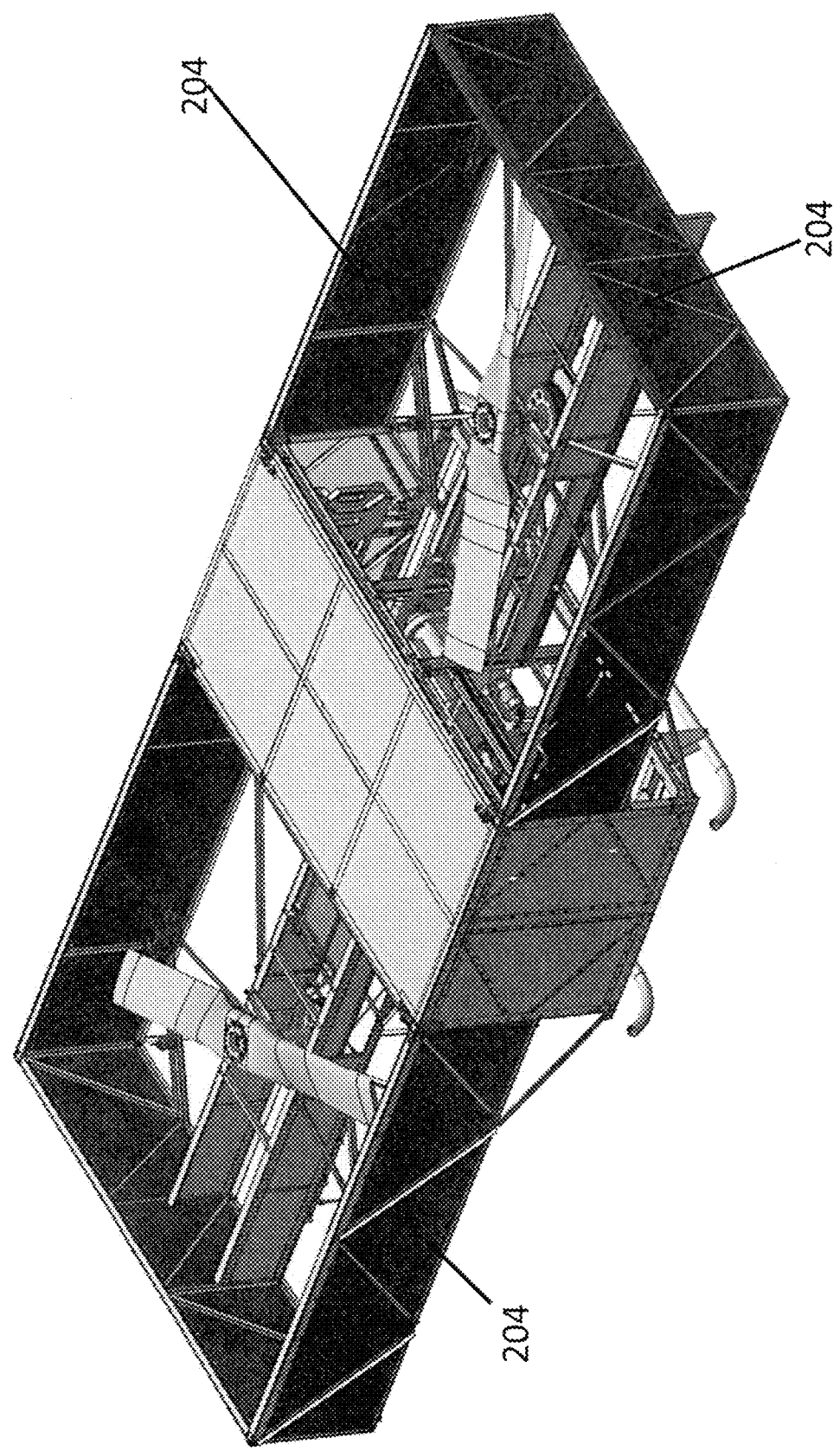
FIG. 2 is another diagram of a multicopter example, consistent with the inventive aspects described here.

FIG. 2 shows another perspective view example multicopter but with an optional wall covering 204 or skirt surrounding the individual sections of the sides of the otherwise open framed multicopter chassis. Such an example covering may be used to channel air toward the propellers and increase flight characteristics including hovering as well as reduce side drafts that could reduce lift from any of the propellers. The open framed chassis could be covered with any kind of material to form the walls such as fabric, aluminum, carbon fiber, plexi-glass, or other material. The walls could also include sensors, wiring, antennae, or other components of the multicopter as described here.

Propeller Overview

Due to potential problems associated with controlling larger multicopters, especially those with propellers in coplanar or parallel planar arrangements, the embodiments described here include a division of types of propellers on a multicopter into larger and smaller propeller sizes. Such a division may allow the multicopter to generate a majority of lift thrust from larger propellers which do not need to change their spin rate very often. Such a division may also allow the multicopter to generate a majority of control thrust from smaller propellers which may change their spin rate at much more frequency than the lifting propellers. Such lifting propellers may be a meter long or longer. And such control propellers may be half as long, or shorter.

Such lift and control propellers may be arranged in any of various positions in the multicopter as shown as an example in FIG. 1 or other arrangement in order to maintain proper balance. Such arrangement may also allow lifting propellers to be configured for developing the main horizontal thrust for the multicopter and creating a majority of the lift for the multicopter. Such an arrangement may also allow the controlling propellers to be configured for developing the maneuvering thrust such as controlling the spatial orientation of the multicopter and its position against the line of travel in operation, as well as developing additional ancillary horizontal thrust for the multicopter. Controlling propellers, because they are smaller, could change spin rates more quickly and adjust to navigation, orientation, pitch, yaw and roll of the multicopter.

In some embodiments, these propellers may be arrange in a co-planar or parallel planar arrangement in the multicopter chassis. Such an arrangement would place the propeller shafts generally in parallel to one another within the chassis of the multicopter and the propeller blades arranged generally parallel to one another. Such an arrangement would also necessitate that each propeller be spaced apart from one another to allow for the propellers to spin freely and change speed without interfering or touching the next propeller, or, arranged just above or below one another so the overlap would have vertical spacing. The result, in such embodiments, would be a flat, overall vertical dimension of the multicopter chassis which encloses all of the propellers. Such a flat shape may allow for storing, stacking, and transportation to be easier than a multicopter with propellers arranged in different axes.

Figure 3:
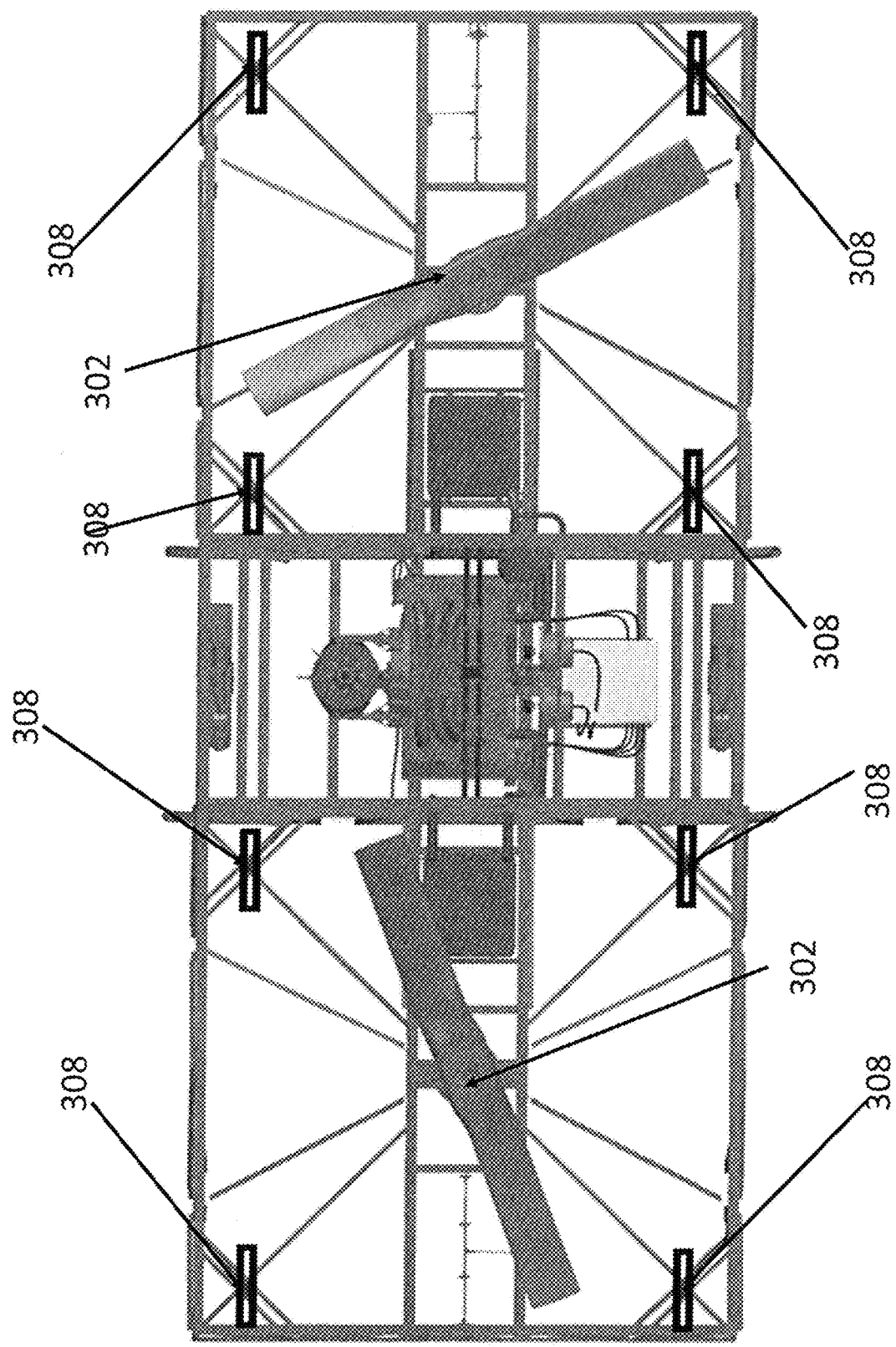
FIG. 3 is another diagram of a multicopter example, consistent with the inventive aspects described here.

FIG. 3 shows a top down view of an example multicopter with larger lifting propellers as well as smaller control propellers. FIG. 3 shows an example position of the larger lifting propellers 302 in the center of the multicopter as well as the example eight control propellers 308 and motors arranged around the periphery of the multicopter chassis. Both sets of propellers are all shown as coplanar or parallel planar in that their propeller shafts are all approximately parallel within the chassis. Thus, each propeller is spaced apart from the next and no propeller arcs would intersect or touch because they are either horizontally spaced, or vertically spaced such as mounted at different heights, on parallel planes, which may allow for overlap of the propeller arcs or a closer spacing of the propeller arcs than if they were on the same plane. Again, the number and position of the smaller control propellers may be different than as shown in FIG. 3. For example, only four control propellers 308 may be used instead of eight and their position within the chassis may be different.

In some examples, each control propeller 308 has its own electric motor [13081] and is controlled by the onboard computer system. Such control may include propeller spin speed as well as synchronization with other control propellers and/or the larger lifting propellers 302. In the arrangement using larger lifting propellers 302 in conjunction with coplanar control propellers 308, the speeds of the controlling propellers 308 would change more frequently than the speed of the lifting propellers 302 in maneuver operations. Because the control propellers would change the pitch, yaw and roll of the overall multicopter, each motor, controlling each controlling propeller 308 would be independently controlled by the onboard computer. This would allow for independent changes of control propeller speed during flight. The lift propellers 302 may also be controlled by the onboard computer but the changes in speed of the lift propellers 302 may not be as frequent or as abruptly changed as the smaller control propellers 308.

Coplanar arrangements of the propellers in the multicopter may also allow for the profile of the chassis to be compact in height. By arranging both the lifting propellers 302 and the controlling propellers 308 in about the same height within the chassis, the overall height of the chassis could be kept relatively short, although wide to accommodate all of the propeller arcs. This flat design could be used to help store multiple multicopters in one place. It could allow them to be stacked one upon the other. It could allow the multicopter to operate in and around structures that would not otherwise be possible.

In some embodiments, the dimensions and weight of the lifting propellers 302 are at least two times larger than the dimensions and weight of the controlling propellers 308, and the quantity of the controlling propellers 308 is at least two times larger than the quantity of the lifting propellers 302. Thus, if a lifting propeller 302 were one meter long, a control propeller would be half a meter long or shorter. In some example embodiments, a lifting propeller 302 may be a meter long and each control propeller 308 may be a quarter meter long.

This division of the propeller group elements into at least two propeller types results in lifting propellers 302, being larger in terms of size (e.g. rotor span or propeller arc), as well as potentially heavier depending on the material used in fabrication of the propellers. The lifting propellers, in operation, may achieve a generally constant speed for most of the flight regime, changing potentially for altitude and hovering maneuvers. Due to this arrangement, the lifting propellers 302 may not need to change their rotation speed as frequently compared to controlling propellers 308. Thus, if the lifting propellers 302 shared a motor, such as an electric motor, internal combustion motor or a turbofan or turbojet engine, the burden on a transmission or synchronization drive would be less, as the lift propellers 302 would tend toward a more constant spin speed as compared to the control propellers 308.

The controlling propellers, in some embodiments, smaller in size and rotor disc and thus having smaller weight and faster response time, may operate mainly to create torsion and inclining moments in relation to the lifting body of the multicopter. This may allow an easier, more efficient and more accurate maneuvering, or change of the spatial orientation of the multicopter and the position of its body against the line of its travel. In some embodiments, the controlling propellers may add to the horizontal thrust created by the larger lifting propellers when the multicopter is tipped toward a general line of direction as disclosed in more detail in FIG. 6.

Figure 4:
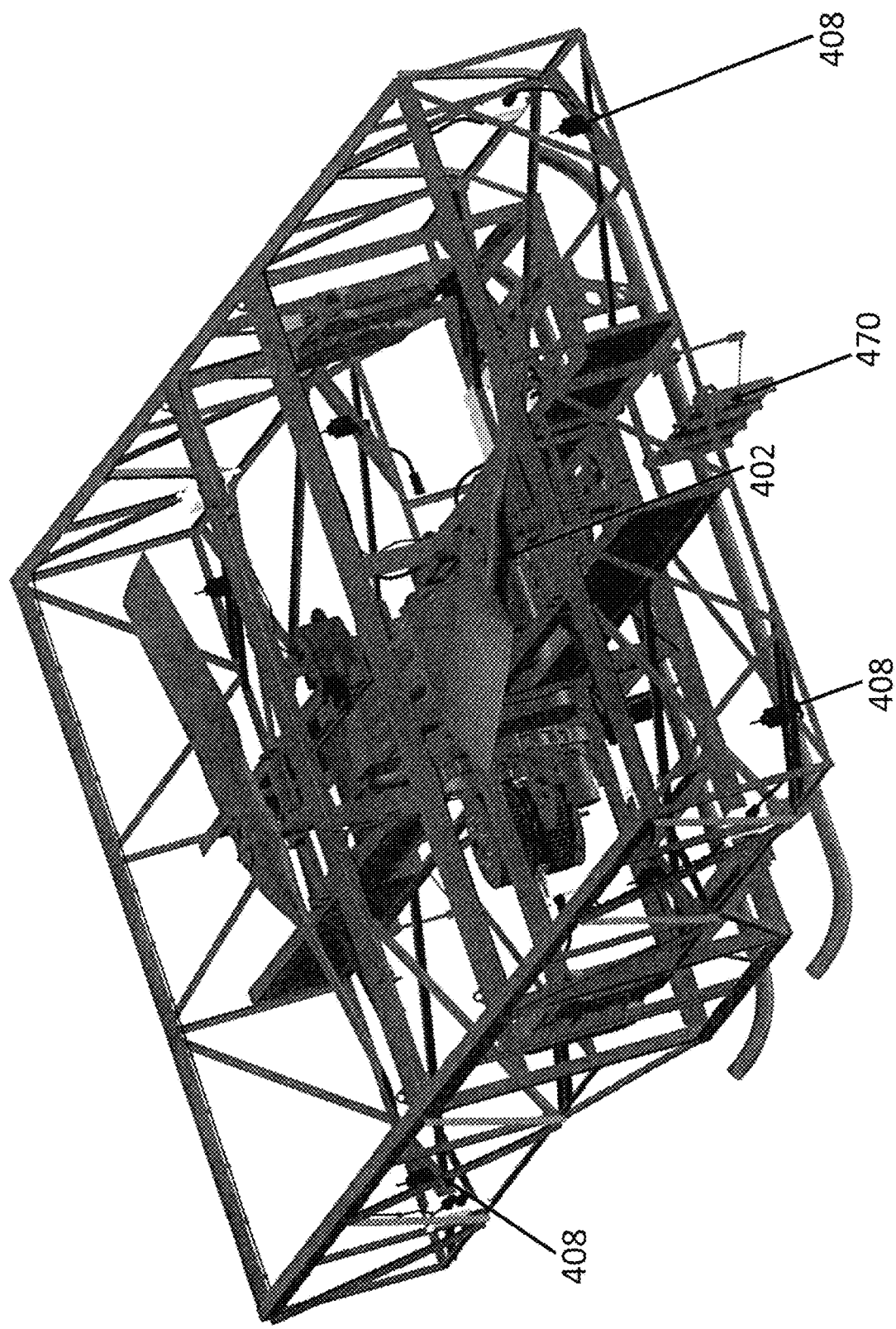
FIG. 4 is another diagram of a multicopter example, consistent with the inventive aspects described here.

FIG. 4 shows another example perspective diagram of an example multicopter. In some embodiments, instead of merely adjusting the speed of the lift 402 and/or control propellers 408, the multicopter orientation in the air may be adjusted with a help of aileron plates arranged parallel to each other and under some or all propellers. The movable plates, or ailerons 470, mounted under the propellers on the chassis may work together with the stabilization system of the multicopter. Thus, the deflecting plates or ailerons may deflect the air flow generated by any of the propellers for maneuvering. FIG. 4 also shows ailerons 470 attached to the chassis attached to any of various systems to control its movement such as a mechanical arm and a servo motor in communication with the onboard computer. The ailerons 470 may be arranged to deflect thrust from the lifting propellers for maneuvering. Ailerons 470 could be placed in any of various places under or on the lower side of the chassis, for the lifting propellers 402 and/or control propellers 408.

In some example embodiments, not only the speed of the propellers may be altered, but the pitch of each individual propeller blade may be adjusted as well. In such examples, during flight, the pitch of a lift propeller blade may be used to adjust lift even if the rotation of the propeller itself remains constant. In some examples, this constant speed of the propellers may use less energy than changing the speed of individual propellers. The system may be allowed to auto rotate in an emergency situation, thereby slowing the descent of the multicopter if power is lost.

In some examples, the propellers may be set on gimbals that move and alter the angle of the entire propeller unit in relation to the overall chassis body frame. In such examples, servo motors may be moved by the onboard computer system to affect the lift of the propeller in its relative section of the multicopter. This may be used for changing any flight regime including hover as well as horizontal travel regimes.

Flight Examples

Figure 5:
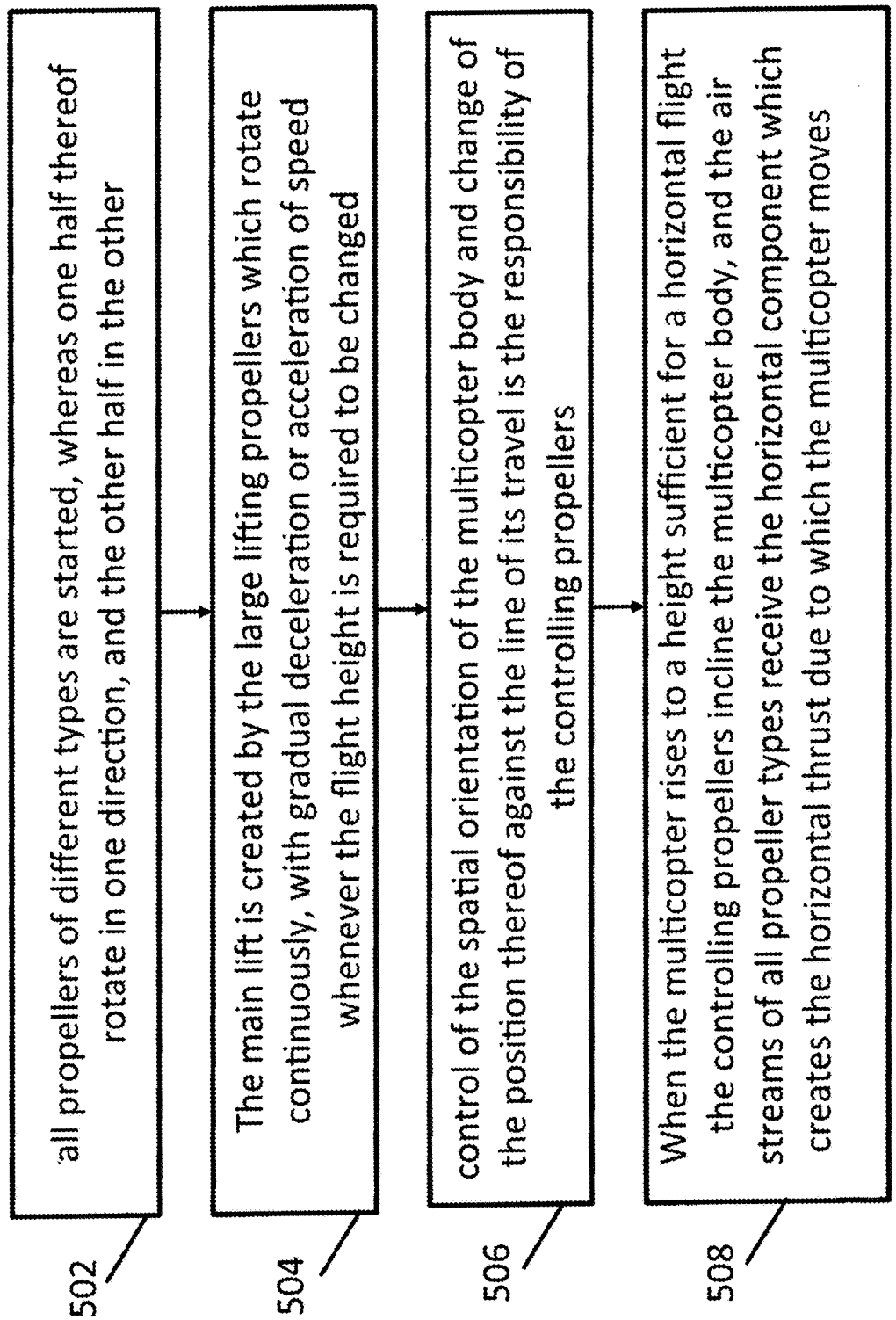
FIG. 5 is a flow diagram of a flight regime consistent with the inventive aspects described here.

FIG. 5 is a flow diagram of a sequence of events for flight of an example multicopter using both larger lifting and smaller control propellers. First, 502 at the start of motion of the multicopter all propellers of both types are started, whereas one half thereof rotate in one direction, and the other half in the other in order to provide for mutual compensation of the reaction torques of the rotating propellers. Next, 504 the main lift is created by the large lifting propellers which rotate with gradual deceleration or acceleration of speed whenever the flight altitude is required to be changed, or to maintain a hover. Then, 506 the function of control of the spatial orientation of the multicopter body and change of the position thereof against the line of its travel is the induced by the controlling propellers which are smaller as compared to the lifting propellers. For this reason the controlling propellers have faster response to spin speed changes and are hence more suitable for frequent speed adjustments than the larger lifting propellers. In some examples, the number of the controlling propellers is greater than that of the lifting propellers—as many as twice or three times as many in some examples. Finally, 508 when the multicopter rises to an altitude sufficient for a horizontal flight, the controlling propellers incline the multicopter body by speeding controlling propellers on one side and slowing them on another. The result is a tipping of the multicopter body and the resultant thrust air streams of all propeller types include the horizontal component which creates horizontal thrust allowing the multicopter to traverse above the ground surface.

Figure 6:
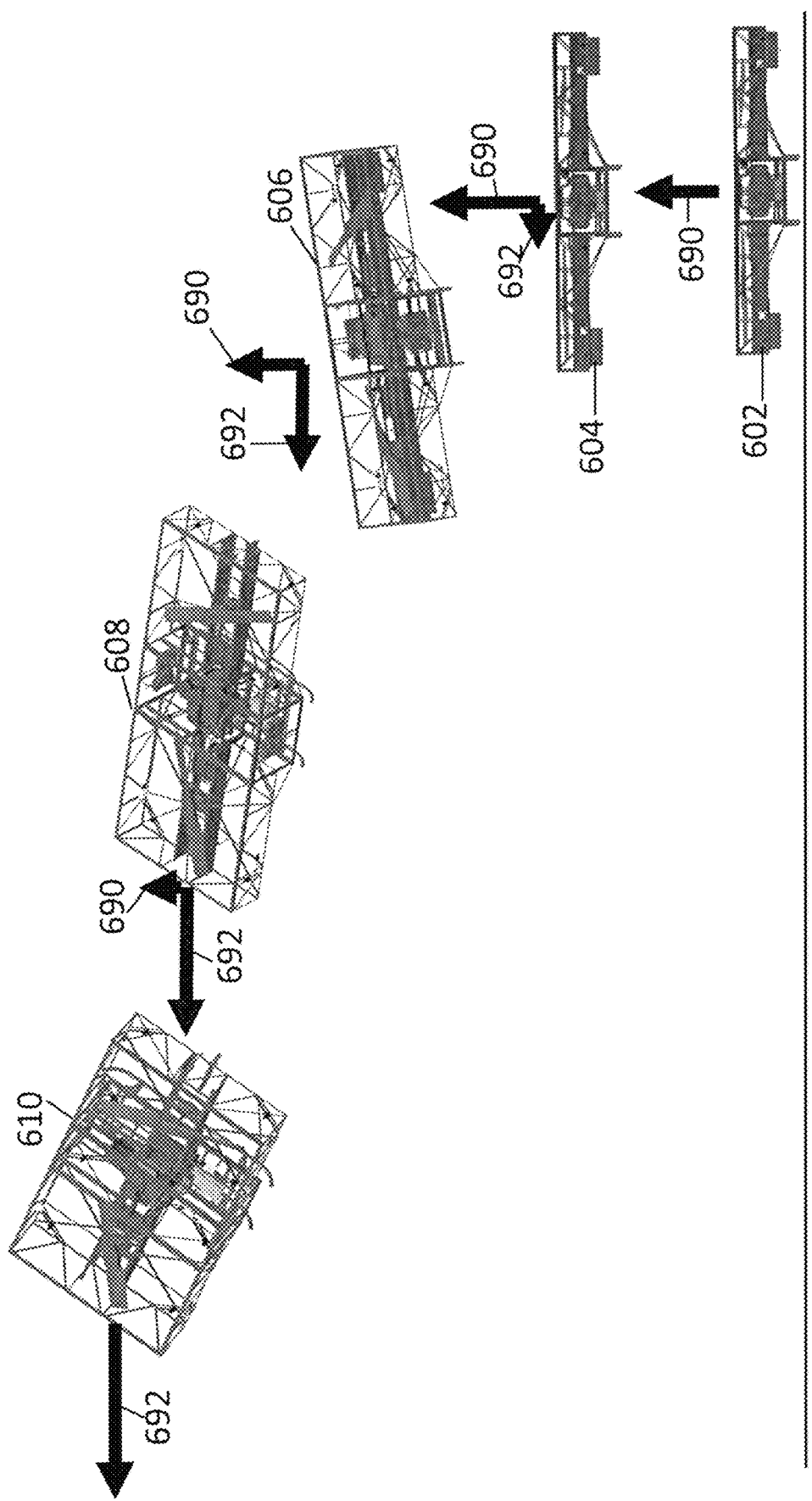
FIG. 6 is an example diagram of a flight regime consistent with the inventive aspects described here.

FIG. 6 shows an example graphical representation of a multicopter as it transitions from takeoff, to hovering, to a horizontal flight regime. First, while on the ground 602, the lifting propellers begin to spin and create vertical lift. The resulting thrust vector 690 is completely vertical. Next, 604 the lifting propellers lift the multicopter off of the ground and the control propellers begin to spin more rapidly on one side of the chassis than the other. The resulting thrust vector is mostly vertical 690 but a small amount of horizontal thrust 692 is created. Next, 606 at a desired altitude off the ground, the control propellers increase rotation speed and tip the chassis of the multicopter to one side toward a direction of travel. This tipping could be controlled by acceleration of control propellers on one side of the chassis and slowing the speed of the controlling propellers on the other side, creating more and less lift of the relative portions of the chassis. The resulting horizontal thrust vector 692 increases as the vertical thrust vector 690 begins to lessen. Next, 608 as the control propellers tip the chassis, the lifting propellers end up creating not only the main vertical lift for the multicopter but also some horizontal thrust as well. The resulting horizontal thrust vector 692 is much larger at this point than the vertical thrust vector 690. Finally, 610, the multicopter utilizes both control propellers as well as lifting propellers to control the altitude as well as the attitude of the multicopter for the most efficient flying regime for the conditions. At this point, the horizontal thrust vector 692 is much larger than the vertical thrust vector if it is even present at all. At any time, the multicopter could pivot back to a direction it was in for takeoff 602 and hover, land, etc. In some embodiments, due to the larger thrust created by the lifting propellers, the multicopter may require an orientation more like it is during takeoff 602 in order to gain significant altitude. When at altitude, the orientation may tip again toward horizontal flight regime 610 and back and forth as needed during flight.

Thus, in some examples, horizontal thrust may be created by both the lifting propellers and the controlling propellers, whereas in some embodiments, the ratio of the horizontal thrust developed by the lifting propellers to that developed by the controlling propellers may be for example 60-40 or 70-30.

Control Examples

Figure 7:
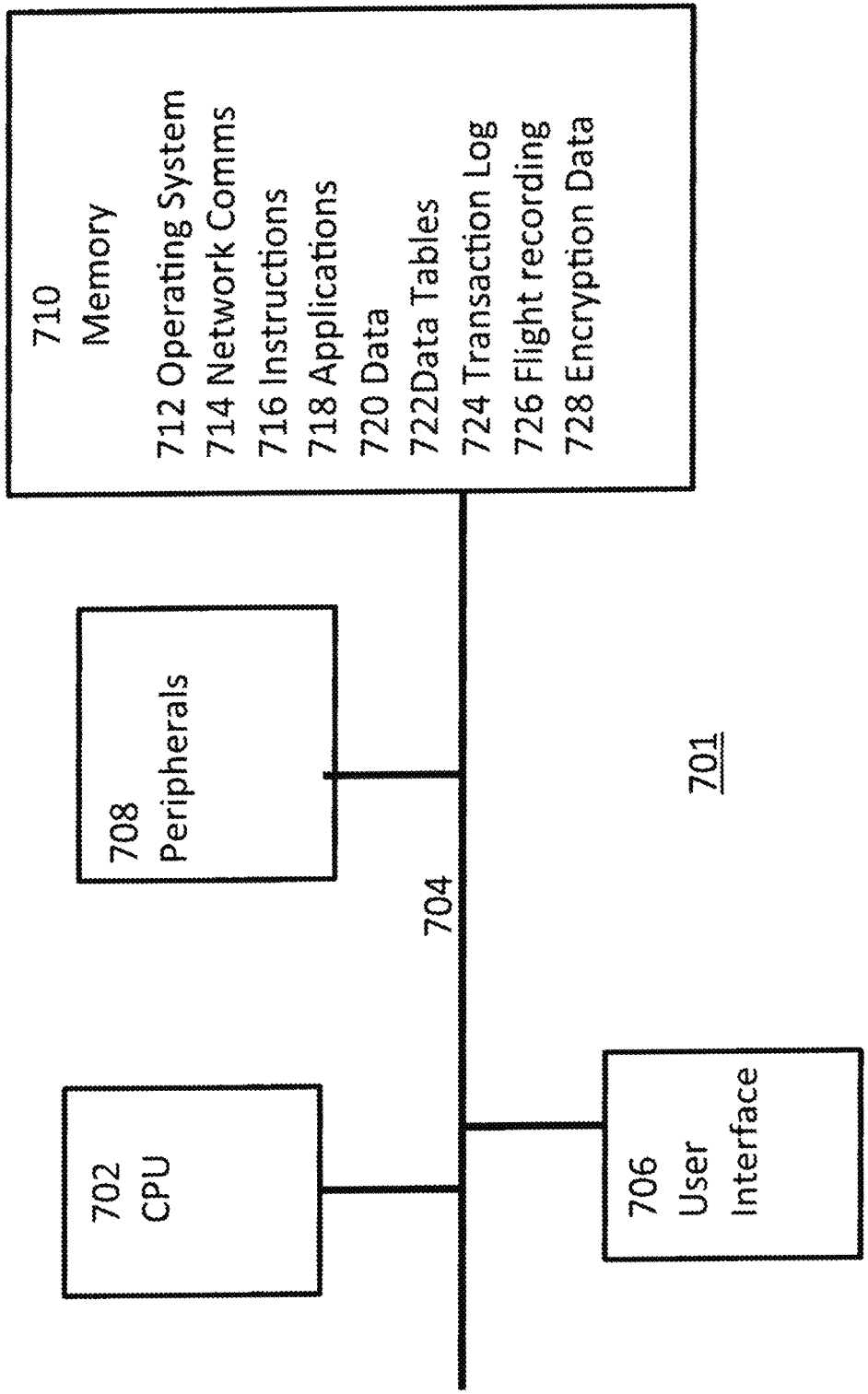
FIG. 7 is an exemplary computer hardware consistent with the inventive aspects described here.

FIG. 7 shows an example grouping of computer hardware 701 that may be used by the multicopter to control propellers, navigate, communicate wirelessly, take sensor readings, operate any onboard peripheral devices, etc. A central processing unit (CPU) 702 may be used to process instructions in the computer 701 and is shown in communication with other computer hardware components by way of a bus 704 or other wiring. The CPU 702 is also in communication with some type of user interface 706. Such a user interface could be any kind of user interface on the multicopter itself, or (not pictured) remotely connected via a wireless transmitter to a ground station or other operator unit. Such a user interface 706 could be used to control the multicopter, navigate, take diagnostic measurements of various aspects of the multicopter, to program flight directions or payload directions (such as agricultural spraying as describe below) into the multicopter. The user interface 706 could be used to alter any autopilot regimes that are programmed into the multicopter or for any other various reasons. The hardware also shows any of various peripherals 708 such as an antenna for remote communication, antennae for a navigation system such as a satellite Global Positioning System (GPS), Glonas, Galileo, LORAN, radar beacon or any other kind of peripheral such as sensor operator, camera, payload sensors, accelerometers, gyro, air speed indicator, altimeter, radar altimeter, speed gauge for motors, sprayer devices, load movement such as winches with hooks, landing gear deployment, aileron movement etc. Finally, a memory 710 is shown with any of various programs such as but not limited to an operating system 712, network communications 714, instructions 716, Applications 718, Data storage 720, Data tables 722, Transaction logs 724, flight parameter recording 726, and encryption data 728. Any of other various programs could be used by the computer hardware in the multicopter.

Such computer hardware may include programs that the multicopter can utilize for particular flight regimes. For example, a hovering program may be utilized by the multicopter for any of various reasons for example, if communication is lost with a ground controller. Auto pilot programs may be used to navigate such as navigation waypoints, hover, loiter, navigate to a home, land if there is a loss of control or input, etc. Auto pilot may be used for cargo pickup and drop off regimes. Auto pilot may be used for agricultural spraying patterns, etc. Any kind of auto pilot or flight control regimes may be programmed into the multicopter computer.

Figure 8A:
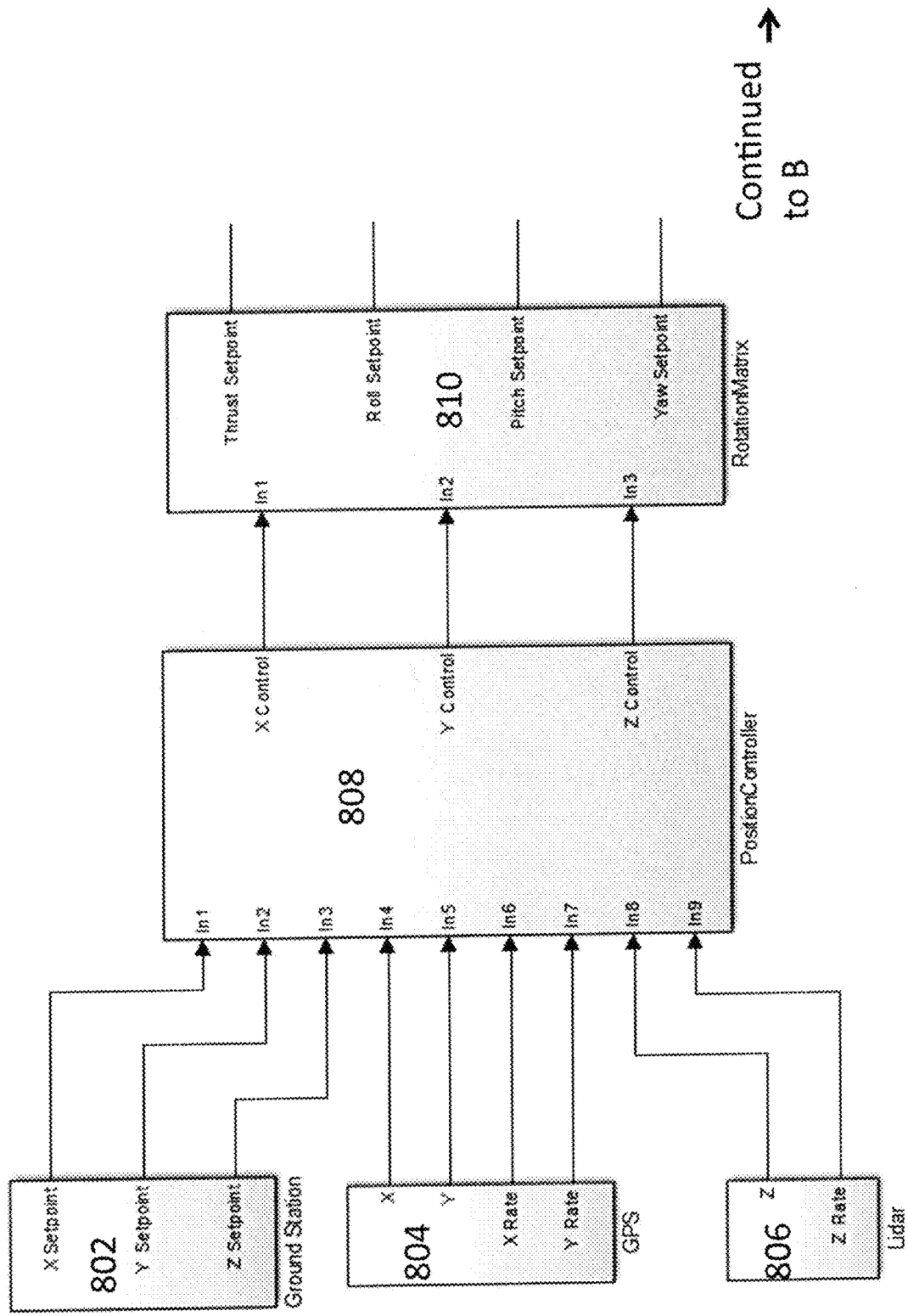
FIGS. 8A and 8B are example control flow diagrams consistent with the inventive aspects described here.
Figure 8B:
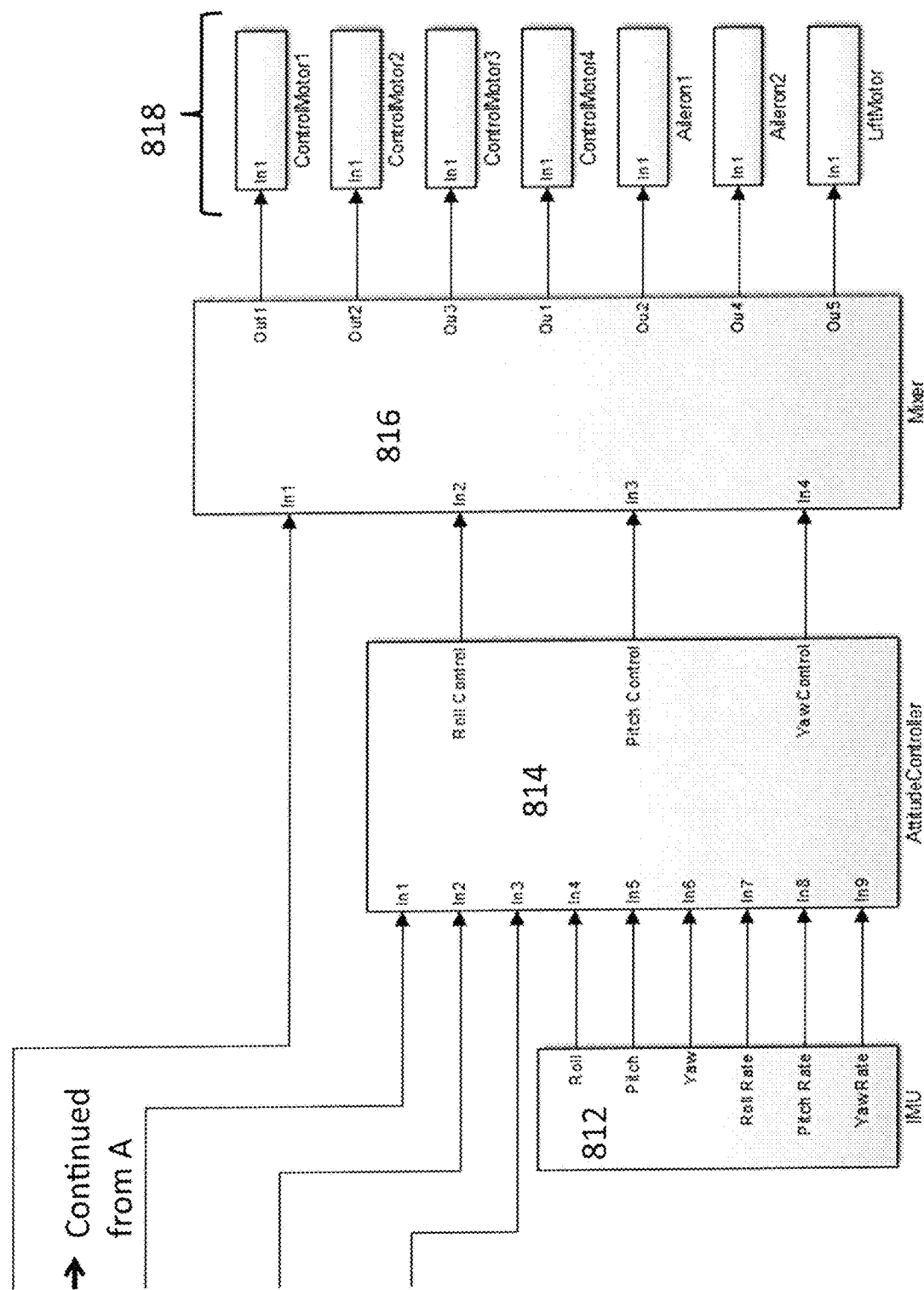

FIG. 8A and FIG. 8B together depict an example control flow according to some embodiments described here. In certain examples, the control system can include two-loops: an internal control loop and an outer control loop. Such an arrangement may be packaged in a single hardware-software combination.

First, an autopilot system receives signals from position sensors and status sensors. Such sensors could be any number of things such as but not limited to, accelerometers, gyroscopes, magnetometers, altimeters, atmospheric pressure sensor, navigation systems such as GPS, GLONASS, LIDAR, LORAN, ground station sensors, internal combustion engine's spin speed sensors, control motors' rpm sensors etc.

In the example of FIG. 8A, there are three inputs from three sources: 802 Ground Station, 804 satellite navigation such as global positioning system, and light detection and ranging LIDAR system 806. Any kind of input could be used, but these three are used for example in FIG. 8A. Next, the position input from any combination of these or other position sensors are fed into the position controller 808. Such a position controller may be a computer implemented system in the onboard computer. The position controller 808 then determines the three dimensional x, y and z control to feed into the rotation matrix 810. The rotation matrix 810 may determine any number of set points such as but not limited to thrust, roll, pitch and yaw.

The Internal Control Loop

The internal control loop can be automatic (automated as well) control of roll, pitch, yaw and thrust of the vehicle. FIG. 8B shows the continuation of the flow from 8A. The attitude controller 814 receives yaw, pitch and roll data from the rotation matrix 810. The attitude controller 814 also receives input from the inertial sensor, gyroscope or inertial measurement unit, IMU 812.

The feedback signals can be roll angles (in relation to horizon), pitch angels (in relation to horizon) and yaw angles (in relation to the north or heading), as well as angular velocity of roll, pitch and yaw, vehicle's altitude, speed of altitude's change, atmospheric pressure etc. The control signals of roll, pitch and yaw angles as well as the control signal of vehicle's thrust come from the outer control loop. Control signals as well as feedback signals of the internal control loop can also be a rotation matrices, quaternions, thrust vectors etc.

The controllers can be for each of the control channels (roll, pitch, yaw and thrust) separately. The controller can be used as P, PI and PID controllers by angle and angular velocity (and any other controllers). Output signals from the controllers 814 to each of the control channels can affect each of the vehicle's actuators—rotors, control propellers, ailerons etc. An effect of each of the control signals can be determined by mixing matrix, where each of the signals is determined by its rate of effect on one or the other actuator.

The mixer 816 may receive input from the attitude controller 814 for yaw, pitch and roll as well as thrust from the rotation matrix 810. The mixer Qq16 may utilize a mixing matrix such as:

| roll | pitch | thrust | yaw | |
|---|---|---|---|---|
| −1 | 1 | 0 | 0 | % Control motors 1 and 2 |
| −1 | −1 | 0 | 0 | % Control motors 3 and 4 |
| 1 | −1 | 0 | 0 | % Control motors 5 and 6 |
| 1 | 1 | 0 | 0 | % Control motors 7 and 8 |
| 0 | 0 | 0 | 1 | % Aileron 1 |
| 0 | 0 | 0 | 1 | % Aileron 2 |
| 0 | 0 | 1 | 0 | % Internal combustion engine |

The output from the mixer 816 may be fed into the various motors for the lifting and controlling propellers 818.

The Outer Control Loop

The outer control loop can be automatic (automated as well) control of position, altitude, heading, speed and move of the vehicle in the global coordinate system etc. The outer control loop can determine flight modes of the vehicle such as a takeoff, a landing, a hold of an altitude above sea level, a hold of an altitude above ground surface, a hold of a point in space, an assignment flight, a flight over obstacles, a return to a start point, a flight at loss of communication, and others as well. The outer control loop can control the vehicle's attachments as well.

The feedback signals for the outer control loop can be a position of the vehicle in the global coordinate system, speed of movement in space, an altitude of the vehicle above the ground (underlying surface/sea level), a rate of an altitude's change, heading, a rate of a heading's change, and others. The control signals for the outer control loop can be the coordinates set in the global coordinate system, the heading, the speed of move in space, the altitude above the ground (underlying surface/sea level), and others.

The controllers can be for each of the control channels (heading, move in latitude, move in longitude, altitude, speed of move, and others) separately. The controller can be used as a proportional (P), proportional-integral (PI) and proportional-integral-derivative (PID) controllers (and any other controllers). Output signals from the controllers to each of the outer loop control channels can affect each of inputs of the internal control loop. The impact of each of the control signals can be determined by formation of rotation matrices, thrust vectors, mixing matrix etc.

Encrypted Control Examples

In some embodiments, the multicopter may be controlled or be in communication with a ground controller or satellite controller. In such example embodiments, the signals sent to and from the multicopter for navigation, direction, or other direction such as control of peripherals such as sensors, cameras, sprayers, loading devices, etc. may be encrypted. Such encryption may assure that the multicopter does not receive interfering control inputs, and that the multicopter communications are only able to be received by the intended ground or satellite station.

Thus, the on-board computer and software and related ground/satellite station software is specifically designed to ensure operations safety. In particular, some embodiments include protection for the control radio channel, protection against malicious intent of the operator and protection against flight controller physical replacement. In some embodiments, the security approach is based on PKI (Public Key Infrastructure). In such examples, the flight controller may store PKI certificates produced by a CA (Certificate Authority) and used to authorize all incoming commands.

In some embodiments, the system splits rights to execute the software operations via loading the pre-designed flight program into a flight controller and rights to design a flight program to be executed by the flight controller. In such examples, a user who has rights to execute the software operations does so by using a related operator certificate, which is produced by the CA. The operator certificate allows the system to set up a secure command radio link with the software and transmit pre-designed flight programs on board. A person who has rights to design a flight program does so by using a related designer certificate, which is also produced by the CA. As a result, the flight program may store a security signature which may ensure that the flight controller program is eligible for execution. The above-described rights distribution may help ensure protection against malicious intent of the operator or other person, such as an attempt to execute an unauthorized takeover of the controls. In order to take full control of the software one would need to obtain both operator certificate and designer certificate which are always distributed between two users, making malicious takeover attempts highly impractical.

In order to protect the system against flight controller physical replacement, some embodiments include an authorization procedure between the flight controller and electric motors controllers of control propellers (EM controllers) or any other kind of peripheral such as sensor operator, camera, payload sensors, accelerometers, gyro, air speed indicator, altimeter, RPM gauge for motors, etc., which could be based on Blockchain technology. EM controllers can be activated by data exchange and verification procedure with an activating side such as a flight controller. This data exchange procedure can only result as a success if the activating side knows keys derived from the EM controller's unique private keys using a specific algorithm. These unique private keys may be loaded into EM controllers secure memory during production. Derived keys may be loaded into the flight controller secure memory also during production. Thus, a flight controller may only work with exact EM controllers present on board. Replacement of the flight controller results in a new flight controller not having derived keys of EM controllers present on board. Such EM controllers cannot be activated by flight controller and will stay inactive which will result in the inability to navigate the system.

FIG. 9 shows an example flow chart diagram of encrypted flight control examples according to some embodiments. In FIG. 9, there are two options which the certificate could be pre-loaded to start the process. IN one option, the Designer certificate ensures that the flight program is eligible to be executed 902. In the other option, the operator certificate allows establishment of a radio channel communication and loads the flight program into the flight controller 904. Either way, the next step is for the flight controller to use the pre-loaded certificate to authorize data sender and incoming data 906. Finally, the EM controller is activated by the flight controller which knows the EM controller's derived key 908. In this way, encryption may be used to protect from third party takeover or malicious control.

Cargo Examples

Because the scale of the multicopters disclosed here may be large enough to lift and move hundreds and even thousands of pounds of cargo, the multicopter could be used for any of various industrial reasons including but not limited to cargo movement and agricultural spraying. Load carrying embodiments may take many forms and be mounted on the chassis in any of various places. For example, in some embodiments, the chassis utilize any number of hooks, rails, baskets, nets, arms, or other holding or lifting devices mounted under it, on the sides of it and/or on the frame itself. Pulleys and/or winches may be mounted as well, to move cargo up and down, relative to the chassis.

In cargo examples, it may be useful to ensure that the cargo is affixed to the multicopter in a way that would not adversely affect weight and balance parameters for flight. Cargo weight and balance may therefore be calculated by onboard sensors placed in various places on the chassis.

The use of piezo electric sensors or strain gauges in various aspects of the body or chassis of the multicopter may be used to detect cargo position and potential imbalances. Such strain gauges may be placed in each of the support chassis, the landing gear, the positions where cargo is tied or affixed, or other places for measurement. The sensors could be in communication with the onboard computer and/or wireless transmitters to another computer to inform a human controller or an auto-controller of the cargo arrangement. Thus, before takeoff or during flight, any deviation from calculated allowable center of gravity range of the multicopter may be detected. In case of such deviations the system issues a warning about this through communications in the remote control and/or autopilot.

Figure 10:
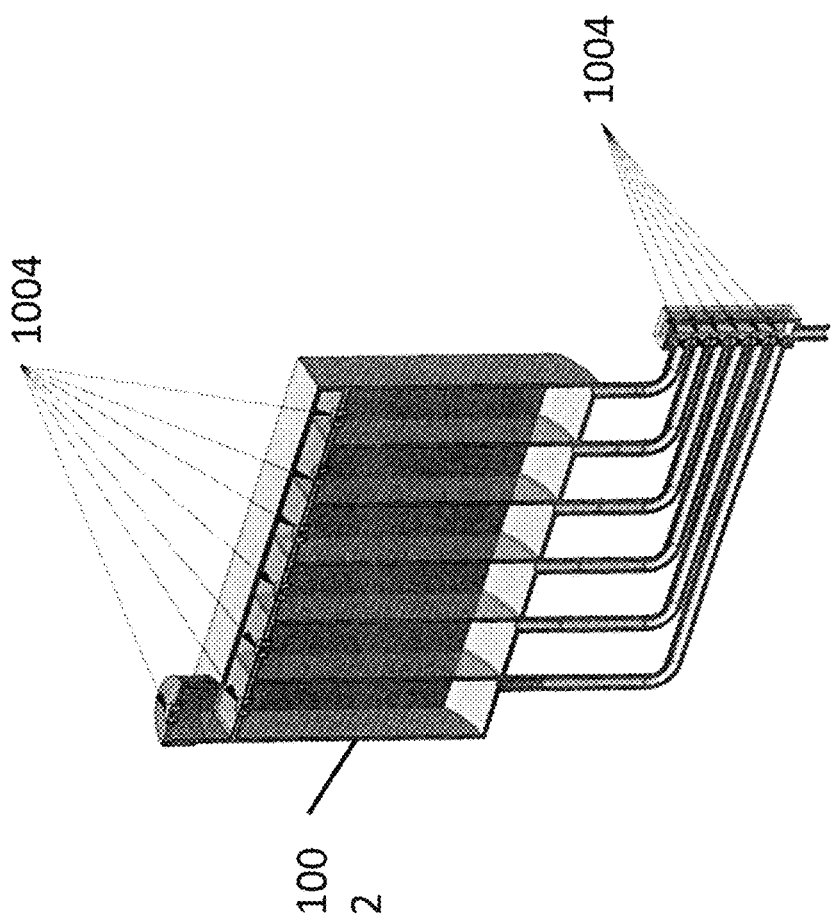
FIG. 10 is an example cargo diagram consistent with the inventive aspects described here.

In cargo arrangements such as for agricultural spraying examples, any of various fertilizers, seeds, water, and/or other chemicals may be transported and delivered by the multicopter. For example, liquid and/or dry material may be delivered by the multicopter through spray nozzles located on the underside and sides of the chassis. In some embodiments, the delivery or emptying of the contents of the tanks may be regulated to ensure weight and balance does not become adverse to flight. FIG. 10 shows an example set of tanks which may be used by the multicopter to store, transport and deliver a spray-able payload. The main holding tanks 1002 are shown as subdivided to reduce sloshing of contents in flight as well as weight distribution during filling and emptying of the tanks. Any additional baffles and or walls within the subdivided tanks may be used as well. Check valves 1004 may be located at the entrance of each sub tank for filling and also at the exit ports for spraying.

FIG. 11 shows details of the example tanks of FIG. 10. The check valve at the main fill port 1102 is shown leading to a chamber 1106 that leads to individual check valves 1104 for each sub tank. Spray-able material may then be loaded through the fill port 1102 and fill the sub tanks in order to later spray or deliver the spray cargo through any arrangement of sprayers.

CONCLUSION

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A multicopter system comprising:
a chassis, with at least one lift motor and at least four control motors mounted to the chassis;
at least two lift propellers configured to create a vertical thrust;
at least four control propellers configured to generate a horizontal thrust;
a transmission connecting the at least one lift motor to the at least two lift propellers;
the at least four mounted control motors each connected to a respective control propeller,
wherein the at least two lift propellers and the at least four control propellers are coplanar or in parallel planes; and
wherein the at least two lift propellers are at least twice as long as the at least four control propellers;
a computer mounted on the chassis, the computer in communication with the at least four control motors and the at least one lift motor, the computer configured to control the at least four control motors to vary rotation speeds of the at least four control propellers and to control the at least one lift motor to vary rotation speed of the at least two lift propellers such that the rotation speed of the at least two lift propellers is always varied less frequently than the rotation speeds of the control propellers during maneuver operations;
an electric power source mounted on the chassis, the electric power source connected to the at least four control motors; and
an antenna mounted on the chassis, in communication with the computer.

2. The system of claim 1 further comprising a plurality of ailerons mounted to the chassis under the at least two lift propellers, the plurality of ailerons configured to deflect air flow generated by any of the at least two lift propellers or the at least four control propellers.

3. The system of claim 1 wherein the electric power source is one of a battery or generator.

4. The system of claim 1 further comprising load sensors mounted on the chassis and in communication with the computer, the computer configured to calculate a load imbalance and indicate a warning of the load imbalance.

5. The system of claim 1 further comprising at least one of a sprayer and a hook mounted on the chassis.

6. The system of claim 1 wherein the at least two lift propellers are at least one meter long.

7. The system of claim 1 wherein the onboard computer is further configured to use encrypted communication with a ground controller by the antenna.

8. The system of claim 1 wherein the at least one lift motor is at least one of electric, internal combustion or gas turbine.

9. The system of claim 1 wherein the computer is further configured to communicate with a navigation system and to control spinning of the at least four control propellers to maneuver the multicopter system to navigation system navigation points.

* * * * *